Aug. 12, 1924.

S. McCAUSLAND 1,504,636

RIM TOOL

Filed Dec. 15, 1923

Sanford McCausland.
INVENTOR
BY Victor J. Evans.
ATTORNEY

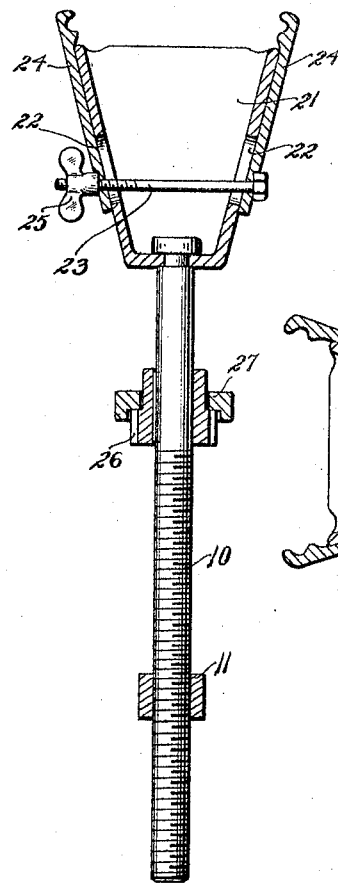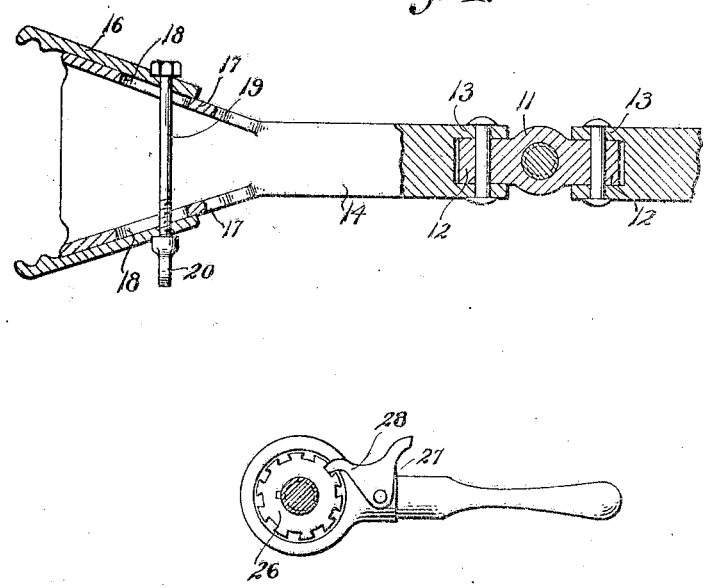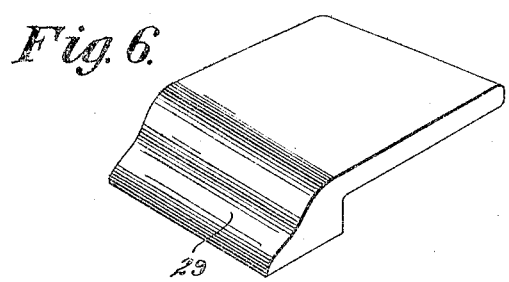

Patented Aug. 12, 1924.

1,504,636

UNITED STATES PATENT OFFICE.

SANFORD McCAUSLAND, OF QUINCY, MASSACHUSETTS.

RIM TOOL.

Application filed December 15, 1923. Serial No. 680,972.

*To all whom it may concern:*

Be it known that I, SANFORD McCAUSLAND, a citizen of the United States, residing at Quincy, in the county of Norfolk and State of Massachusetts, have invented new and useful Improvements in Rim Tools, of which the following is a specification.

It is the purpose of this invention to provide a rim tool designed to facilitate the operation of contracting a tire carrying rim for the purpose of removing a tire therefrom, and subsequently spreading the rim to hold the tire thereon after it has been replaced upon the rim.

More specifically stated, the invention embodies a plurality of adjustable rim clamps adapted to engage the rim at spaced points, one of the clamps being supported by one end of a screw, while the other clamps are carried by arms pivoted upon a collar mounted to travel longitudinally of the screw when the latter is rotated, the screw being equipped with a pawl and ratchet device to facilitate operating the screw for the purpose of either retracting or expanding of the rim as the occasion may require.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 3 is a sectional view taken on the line 3—3 of Figure 1.

Figure 4 is a sectional view taken on the line 4—4 of Figure 1.

Figure 5 is a sectional view taken on the line 5—5 of Figure 2, looking in the direction of the arrows.

Figure 6 is a perspective view of the wedge shaped element adapted to be positioned between the adjacent ends of the rim after the latter has been contracted.

Figure 1:
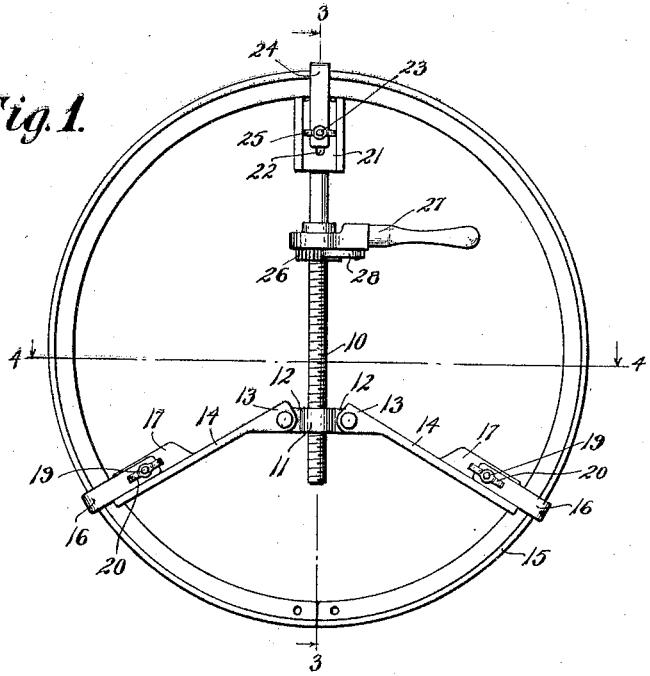
Figure 1 is a view showing the manner in which the tool is initially associated with the rim.

The tool forming the subject matter of the present invention comprises a screw 10 which is threadedly associated with a collar 11 in a manner whereby the latter is caused to travel longitudinally of the screw when the latter is rotated. Projecting from the collar 11 at diametrically opposite points are lugs 12, each lug being received by the bifurcated extremity 13 of an arm 14. These arms are pivoted upon the lugs 12 so that they can be arranged at any angle with relation to the screw 10 incident to the use of the tool, and thus make it possible to engage the rim 15 at any desired point at either side of the meeting ends thereof. Each of these arms 14 of course carries a clamp designed to engage the rim 15. Each clamp consists of a pair of hook like clamping elements 16 which are arranged to bear against the flanges 17 carried by the particular arm with which the clamp is associated. These flanges 17 are arranged on one side of the arm adjacent the free end thereof, and in divergent relation to prevent slipping of the clamping elements 16 when the tool is in use, the flanges 17 are longitudinally slotted as at 18 to permit the clamping elements 16 to be presently adjusted with relation to said flanges and the arm 14. The clamping elements are supported by a bolt 19 which passes through the slots of said flanges, and which bolt is equipped with a winged nut 20 adapted to be tightened to hold the clamping elements fixed relatively in engagement with the rim 15. Supported by one end of the screw 10 is a hollow member 21, the sides of which are divergently disposed and slotted as at 22. These slots receive the bolt 23 which support the hook like clamping elements 24 similar in construction with the clamping elements 16 above referred to. The bolt 23 is equipped with a thumb nut 25 which when tightened holds the clamping elements fixed upon the rim. It is of course to be understood that the screw 10 is swivelly connected to this hollow member 21 so that the screw can be rotated when the tool is associated with the rim in the manner clearly shown in Figure 1.

Carried by the screw 10 is a ratchet wheel 26 above which is arranged a handle 27 loosely mounted upon the screw, the handle being provided with pawls 28 which singly cooperate with the ratchet wheel 26 so that the screw can be readily rotated in either direction.

Figure 2:
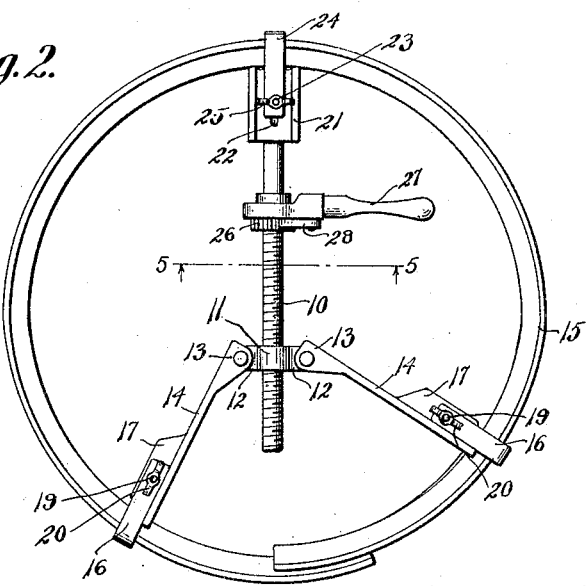
Figure 2 is a view showing the rim contracted.

In practice, the tool is arranged within the confines of the rim 15, and the clamping elements 24 of the clamp at one end of the screw engage with the rim at a pont diametrically opposite the meeting ends of the rim or approximately so. The arms 14 are then swung into divergent relation, and the clamping elements 16 of the respective clamps carried by these arms arranged to engage or clamp the rim 15 at any desired point adjacent the meeting ends of the rim. The handle is then operated to rotate the screw 10 in the proper direction to cause the collar 11 to move upwardly on the screw, during which operation, the rim is broken and retracted as shown in Figure 2. With the rim in this condition, the tire can be removed from the rim for repair or for any other purpose whatsoever. After the rim has been broken initially, a wedge shaped element 29 is positioned between the ends of the rim to allow one end of the rim to slide over the other as the rim is being contracted. After the tire has been replaced upon the rim 15, the screw 10 is rotated in an opposite direction, causing the collar 11 to move toward the free end of the screw, during which time the rim is expanded to its normal condition. The clamp can then be readily loosened and the entire tool separated from the rim.

While it is believed that from the foregoing description, the nature and advantages of the invention will be readily apparent. I desire to have it understood that I do not limit myself to what is herein shown and described, and that such changes may be resorted to when desired as fall within the scope of what is claimed.

Having thus described the invention, I claim:

A rim tool comprising a screw, a collar threaded thereon and adapted to move longitudinally thereof when the screw is rotated, arms pivoted on the collar and adapted to be arranged in divergent relation for use, a clamp carried by each arm and arranged to engage said rim at a point adjacent the meeting ends thereof, a clamping device supported by one end of the screw and swivelly connected therewith, said device including a hollow member having divergent sides, said sides having aligned slots, clamping elements reposing on said sides, a bolt connecting the clamping elements and passed through said slots, and means including a handle for rotating said screw in either direction for the purpose specified.

In testimony wherof I affix my signature.

SANFORD McCAUSLAND.